US012781905B2

(12) United States Patent
Lin et al.

(10) Patent No.: US 12,781,905 B2
(45) Date of Patent: Nov. 3, 2026

(54) INTEGRATED EXPANSION KETTLE, COOLING SYSTEM AND VEHICLE

(71) Applicants: ZHEJIANG GEELY HOLDING GROUP CO., LTD., Hangzhou (CN); ZHEJIANG LIANKONG TECHNOLOGIES CO., LTD, Ningbo (CN)

(72) Inventors: Bingrong Lin, Hangzhou (CN); Junbo Xu, Hangzhou (CN); Florent Pierre Capou, Hangzhou (CN); Bi Dun, Hangzhou (CN); Junzhe Zhang, Hangzhou (CN); Haijiang Dai, Hangzhou (CN); Chunming Wu, Hangzhou (CN)

(73) Assignees: ZHEJIANG GEELY HOLDING GROUP CO., LTD., Hangzhou (CN); ZHEJIANG LIANKONG TECHNOLOGIES CO., LTD, Ningbo (CN)

( * ) Notice: Subject to any disclaimer, the term of this patent is extended or adjusted under 35 U.S.C. 154(b) by 226 days.

(21) Appl. No.: 18/766,988

(22) Filed: Jul. 9, 2024

(65) Prior Publication Data

US 2024/0360945 A1 Oct. 31, 2024

Related U.S. Application Data

(63) Continuation of application No. PCT/CN2023/090797, filed on Apr. 26, 2023.

(30) Foreign Application Priority Data

May 13, 2022 (CN) ......................... 202210524219.6

(51) Int. Cl.
*F16L 55/05* (2006.01)
*B60K 11/02* (2006.01)

(52) U.S. Cl.
CPC .............. *F16L 55/05* (2013.01); *B60K 11/02* (2013.01)

(58) Field of Classification Search
CPC ......... F16L 55/05; F01P 11/028; F01P 11/029
(Continued)

(56) References Cited

U.S. PATENT DOCUMENTS 5,456,218 A * 10/1995 Theorell ................ F01P 11/029 165/104.32
2008/0190385 A1* 8/2008 Bangert ................. F01P 11/029 123/41.44

(Continued)

FOREIGN PATENT DOCUMENTS

CN 206530395 U 9/2017
CN 209369912 U 9/2019

(Continued)

OTHER PUBLICATIONS

European Search Report issued in counterpart European Patent Application No. EP 23802657.9, dated Oct. 31, 2025.

(Continued)

*Primary Examiner* — Steve S Tanenbaum
(74) *Attorney, Agent, or Firm* — Westbridge IP LLC

(57) ABSTRACT

Disclosed is an integrated expansion kettle, including a kettle body, a coolant flow channel passing through a chamber is provided inside the kettle body; at least one group of gas-liquid separation mechanisms is provided on the coolant flow channel; each group of the gas-liquid separation mechanism includes a first opening provided on the coolant flow channel for liquid in the chamber to flow into the coolant flow channel and a second opening for liquid in the coolant flow channel to flow into the chamber, and a pressure at the first opening is greater than a pressure at the second opening. A cooling system is also disclosed, which
(Continued)

includes a motor cooling circuit, a battery cooling circuit and the expansion kettle. A vehicle is also disclosed, which includes the cooling system.

19 Claims, 6 Drawing Sheets

(58) Field of Classification Search
USPC ..................................................... 165/104.33
See application file for complete search history.

(56) References Cited

U.S. PATENT DOCUMENTS

| | | | | |
|---|---|---|---|---|
| 2017/0350307 | A1* | 12/2017 | Kerkewitz | F01P 11/029 |
| 2021/0301713 | A1* | 9/2021 | Komatsu | F01P 11/029 |

FOREIGN PATENT DOCUMENTS

| | | | | |
|---|---|---|---|---|
| CN | 209838523 | U | 12/2019 | |
| CN | 210127894 | U | 3/2020 | |
| CN | 210178459 | U | 3/2020 | |
| CN | 213598064 | U | 7/2021 | |
| CN | 113250806 | A | 8/2021 | |
| CN | 214787664 | U | 11/2021 | |
| CN | 215170326 | U | 12/2021 | |
| CN | 215907947 | U | 2/2022 | |
| CN | 114837796 | A | 8/2022 | |
| EP | 1505273 | A2 | 2/2005 | |
| JP | 2003003847 | A | 1/2003 | |
| JP | 2005144437 | A | 6/2005 | |
| JP | 2014061873 | A | 4/2014 | |
| JP | 2019132130 | A | 8/2019 | |
| JP | 2020067081 | A | 4/2020 | |
| JP | 2020183734 | A | 11/2020 | |
| WO | WO-2021243720 | A1 * | 12/2021 | B01D 19/0042 |

OTHER PUBLICATIONS

First Office Action issued in counterpart Japanese Patent Application No. 2024-558071, dated Oct. 7, 2025.
First Office Action issued in counterpart Chinese Patent Application No. 202210524219.6, dated Dec. 29, 2022.
International Search Report and Written Opinion issued in corresponding PCT Application No. PCT/CN2023/090797, dated Aug. 6, 2023.
Notification to Grant Patent Right for Invention issued in counterpart Chinese Patent Application No. 202210524219.6, dated May 12, 2023.
Decision to Grant a Patent issued in counterpart Japanese Patent Application No. JP 2024-558071, dated Dec. 9, 2025.
Request for the Submission of an Opinion issued in counterpart Korean Patent Application No. KR 10-2024-7025967, dated Dec. 12, 2025.
Written Decision on Registration issued in counterpart Korean Patent Application No. KR 10-2024-7025967, dated Apr. 13, 2026.

* cited by examiner

INTEGRATED EXPANSION KETTLE, COOLING SYSTEM AND VEHICLE

CROSS-REFERENCE TO RELATED APPLICATIONS

The present application is a continuation application of International Application No. PCT/CN2023/090797, filed on Apr. 26, 2023, which claims priority to Chinese Patent Application No. 202210524219.6, filed on May 13, 2022. The disclosures of the above-mentioned applications are incorporated herein by reference in their entireties.

TECHNICAL FIELD

The present application relates to the technical field of expansion kettle, and in particular to an integrated expansion kettle, a cooling system and a vehicle.

BACKGROUND

Expansion kettles are used in many industries, especially in the field of vehicles. Due to the thermal expansion and contraction of water in the heating system, when the hot water is heated, the water volume in the system increases. When there is no place to accommodate this part of the expansion of water, the water pressure in the heating system increases, which will affect normal operation. The expansion tank accommodates the expansion of the system water, which can reduce the water pressure fluctuation caused by the expansion of water in the system, and improve the safety and reliability of the system operation. When the system leaks for some reason or the system cools down, the water level of the expansion tank drops to replenish the system. In addition to playing the role of stabilizing pressure and unloading, the expansion kettle can play a buffering role when the pressure changes slightly.

After the entire cooling system is vacuum-filled on the production line and statically filled during after-sales maintenance, there will be a large amount of air in the system. The presence of air will affect the life of the water pump, the heat dissipation efficiency, and produce abnormal noise. The air needs to be separated and stored above the liquid level of the expansion kettle. In the related art, the expansion kettle does not have a dedicated gas-liquid separation function. Generally, gas-liquid separation is performed through an external gas-liquid separator. For the gas-liquid separator, the buoyancy of the air is generally used to achieve gas-liquid separation. However, the liquid entering the separator has a certain flow rate. When the liquid pushes the bubbles to float to the liquid surface, if part of the kinetic energy is not removed, it will impact the liquid surface, thereby generating abnormal noise. Especially when degassing at a large flow rate, the flow rate is large and the abnormal noise generated by the impact is more obvious. On the contrary, if too much kinetic energy of the liquid is removed by other means, such as a tortuous design of the inlet and outlet flow routes by isolating multiple chambers. On the one hand, such design only uses air buoyancy for gas-liquid separation, and the separation efficiency is not high; on the other hand, the coolant stays in the gas-liquid separator for a long time, and excessive heat exchange occurs, which is prone to excessive heat leakage, resulting in a large temperature difference between the inlet and outlet liquids.

SUMMARY

In view of the above shortcomings in the related art, the purpose of the present application is to provide an integrated expansion kettle, a cooling system and a vehicle, which solves the problem that the existing expansion kettle has no special gas-liquid separation function, and at the same time solves the problems of low efficiency, abnormal noise and large inlet and outlet temperature difference in the gas-liquid separation process.

To achieve the above purpose, the present application provides the following technical solutions:

an integrated expansion kettle, including a kettle body, a chamber for containing liquid is provided inside the kettle body, and a liquid inlet and a liquid outlet are provided on the kettle body;

a coolant flow channel passing through the chamber is provided inside the kettle body; one end of the coolant flow channel is communicated with the liquid inlet, and the other end of the coolant flow channel is communicated with the liquid outlet;

at least one group of gas-liquid separation mechanisms is provided on the coolant flow channel; each group of the gas-liquid separation mechanism includes a first opening provided on the coolant flow channel for liquid in the chamber to flow into the coolant flow channel and a second opening for liquid in the coolant flow channel to flow into the chamber, and a pressure at the first opening is greater than a pressure at the second opening; and in response to that the kettle body is working, liquid and gas in the coolant flow channel is configured to flow into the chamber from the second opening, and liquid in the chamber is replenished into the coolant flow channel from the first opening.

In an embodiment, the first opening and the second opening of each group of the gas-liquid separation mechanisms are provided on a same side of the coolant flow channel or opposite sides of the coolant flow channel.

In an embodiment, the first opening and the second opening of each group of the gas-liquid separation mechanisms are provided opposite to each other, or the first opening and the second opening are staggered along a flow direction of the coolant flow channel or a circumferential direction of the coolant flow channel.

In an embodiment, one or more fluid redirection portions are provided on the coolant flow channel, and the first opening and the second opening are provided on the fluid redirection portion; and in response to that liquid in the coolant flow channel flows through the first opening and the second opening, the fluid redirection portion is configured to make a flow velocity of liquid in the coolant flow channel at the second opening be greater than a flow velocity of liquid at the first opening.

In an embodiment, the fluid redirection portion is a bent section or a bending section; the first opening is provided at an inner bending side of the bent section or an inner bending side of the bending section, and the second opening is provided at an outer bending side of the bent section or an outer bending side of the bending section.

In an embodiment, one side of the coolant flow channel is concave or convex to form the fluid redirection portion.

In an embodiment, in response to that the kettle body is working, the first opening and the second opening are submerged below a liquid level of the chamber.

In an embodiment, a vertical distance between the first opening and the second opening and the liquid level is greater than or equal to 5 mm.

In an embodiment, the coolant flow channel includes a liquid inlet section communicated with the liquid inlet, a liquid outlet section communicated with the liquid outlet, and a gas-liquid separation section connected between the liquid inlet section and the liquid outlet section; and the gas-liquid separation section is provided at a middle area of the kettle body, and the first opening and the second opening of the gas-liquid separation mechanism are provided on the gas-liquid separation section.

In an embodiment, an installation height of one end of the gas-liquid separation section communicated with the liquid outlet section is lower than or equal to an installation height of one end of the gas-liquid separation section communicated with the liquid inlet section.

In an embodiment, the gas-liquid separation section includes a downstream channel groove and an upper cover; a first end surface of the upper cover is covered on the downstream channel groove, and a second end surface of the upper cover is abutted against a top of the kettle body; and the first opening and the second opening of the gas-liquid separation mechanism are opened on a sidewall of the downstream channel groove.

In an embodiment, an edge of the first opening and an edge of the second opening are configured to extend towards the first end surface of the upper cover and are flush with the first end surface of the upper cover.

In an embodiment, an edge of the upper cover is provided with at least one diversion portion extending outward, and the diversion portion is corresponding to the second opening.

In an embodiment, a first reinforcing rib is provided on the first end surface of the upper cover corresponding to an edge of the downstream channel groove, and a second reinforcing rib is provided on the second end surface of the upper cover; and the second reinforcing rib is configured to extend and abut against the top of the kettle body.

In an embodiment, a clamping member is provided on the sidewall of the downstream channel groove, and the upper cover is assembled with the downstream channel groove through the clamping member.

In an embodiment, the kettle body includes a lower kettle body and an upper kettle cap, and the downstream channel groove is provided in the lower kettle body;

the first end surface of the upper cover is covered on the downstream channel groove, and the second end surface of the upper cover is abutted against the upper kettle cap; and in response to that the upper kettle cap is assembled with the lower kettle body, the upper cover is tightly pressed against the downstream channel groove.

In an embodiment, the kettle body is further provided with a motor filling port, a degassing liquid inlet and an after-sales switch, and the degassing liquid inlet is communicated with the after-sales switch and is configured to control an opening state and a closing state of the degassing liquid inlet through the after-sales switch; and the motor filling port is provided at a bottom of the kettle body, and the degassing liquid inlet and the after-sales switch are provided at the top of the kettle body.

In an embodiment, a pressure relief valve and a liquid level sensor are further provided on the kettle body.

The present application also provides a cooling system, including a motor cooling circuit, a battery cooling circuit and the expansion kettle.

The present application also provides a vehicle, including the cooling system.

In summary, the present application provides an integrated expansion kettle, a cooling system and a vehicle with beneficial effects: the liquid and gas in the coolant flow channel flow into the chamber from the second opening, thereby bringing the gas of the cooling circuit into the expansion kettle, and the liquid in the chamber is replenished into the coolant flow channel from the first opening, thereby bringing the liquid of the expansion kettle into the cooling circuit, and realizing a primary separation of gas and liquid, which does not affect the overall flow rate of the cooling circuit, and ensure the efficiency of gas-liquid separation. After the gas is exported from the coolant flow channel to the chamber, a secondary separation of gas and liquid is realized by the buoyancy of the gas, so that the increasing of the flow rate of the cooling circuit does not push the gas and liquid to impact the liquid surface to produce abnormal noise. The over degassing time of the gas-liquid separation is reduced, the heat leakage is reduced, and the temperature difference between the liquid inlet and the liquid outlet of the coolant flow channel is greatly reduced.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

DETAILED DESCRIPTION OF THE EMBODIMENTS

Figure 1:
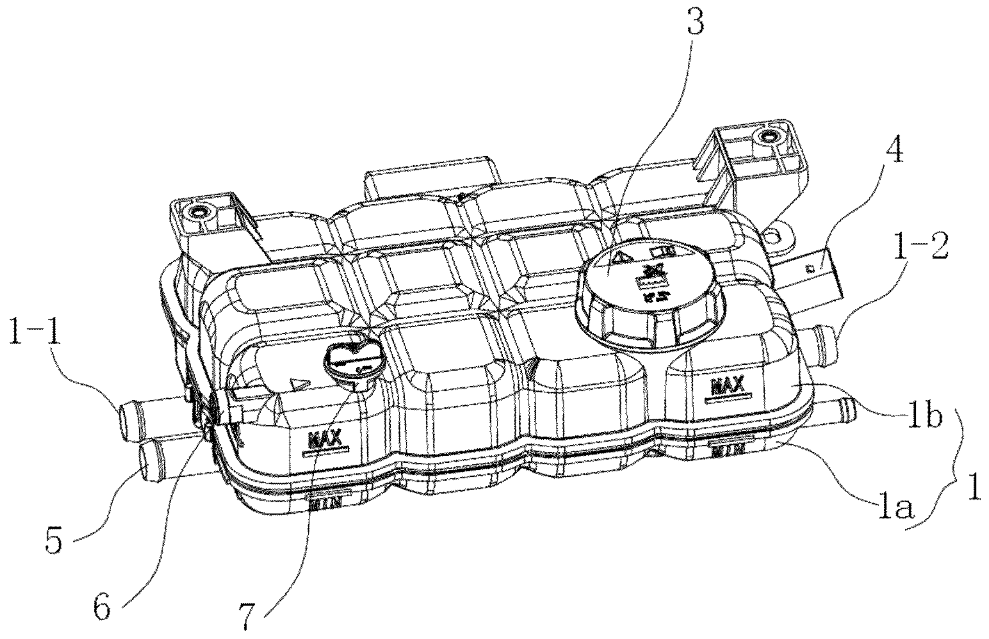
FIG. 1 is a schematic structural view of an integrated expansion kettle according to an embodiment of the present application.

The following is an explanation of the implementation of the present application through specific examples. Those skilled in the art can easily understand other advantages and effects of the present application from the contents disclosed in this specification. The present application can also be implemented or applied through other different specific implementations, and the details in this specification can also be modified or changed in various ways based on different viewpoints and applications without departing from the spirit of the present application. It should be noted that the following embodiments and the features in the embodiments can be combined with each other without conflict. It should also be understood that the terms used in the embodiments of the present application are intended to describe specific implementations, not to limit the scope of the present application. The test methods for which specific conditions are not specified in the following examples are usually carried out under conventional conditions or under the conditions recommended by the manufacturers.

Referring to FIG. 1 to FIG. 11, it should be noted that the structures, proportions, sizes, etc. illustrated in the drawings of this specification are only used to match the contents disclosed in the specification for those skilled in the art to understand and read, and are not used to limit the limiting conditions for the implementation of the present application, so they have no technical substantive significance. Any structural modification, change in proportional relationship or adjustment of size, without affecting the effects and purposes that can be achieved by the present application, should still fall within the scope of the technical content disclosed in the present application. At the same time, the terms such as "upper", "lower", "left", "right", "middle" and "one" quoted in this specification are only for the convenience of description, and are not used to limit the scope of the implementation of the present application. The change or adjustment of their relative relationship should also be regarded as the scope of the implementation of the present application without substantial changes in the technical content.

When the embodiment gives a numerical range, it should be understood that unless otherwise specified in the present application, the two endpoints of each numerical range and any value between the two endpoints can be selected. Unless otherwise defined, all technical and scientific terms used in the present application are consistent with the related art knowledge of technicians in this technical field and the records of the present application. The present application can also be implemented using any methods, devices and materials in the related art that are similar or equivalent to the methods, devices and materials in the embodiments of the present application.

Figure 2:
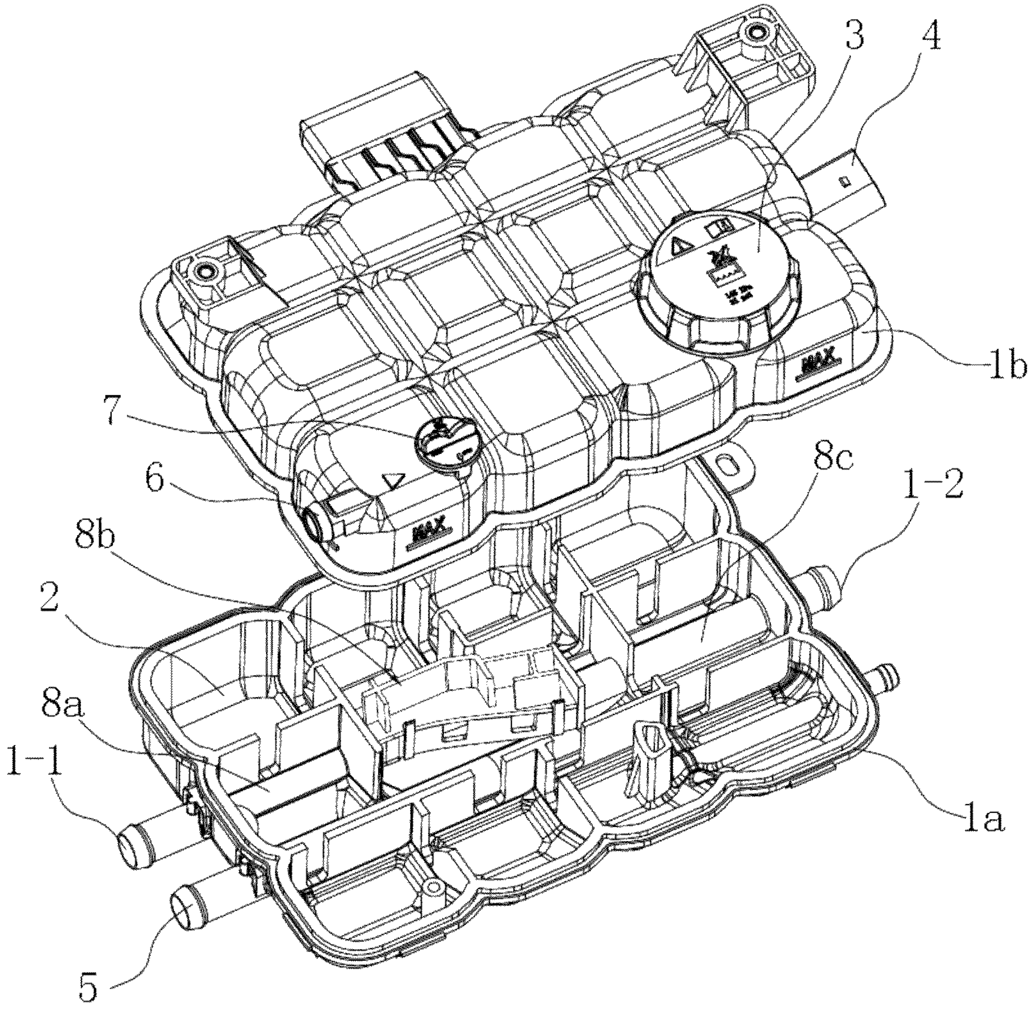
FIG. 2 is an exploded view of the integrated expansion kettle according to an embodiment of the present application.

Referring to FIG. 1 and FIG. 2, an integrated expansion kettle, a cooling system and a vehicle are provided. The kettle includes a kettle body 1. A chamber 2 for containing liquid is provided inside the kettle body 1, and a liquid inlet 1-1 and a liquid outlet 1-2 are provided on the kettle body 1. The kettle body 1 includes a lower kettle body **1*a* and an upper kettle cap 1*b*. The shape of the kettle body 1 can be designed according to the installation space and is not limited to the shape of the present application. The kettle body 1 is provided with a pressure relief valve 3 and a liquid level sensor 4**.

Referring to FIG. 1 and FIG. 2, the kettle body 1 is also provided with a motor filling port 5, a degassing liquid inlet 6 and an after-sales switch 7, and the degassing liquid inlet 6 is communicated with the after-sales switch 7 and controls the opening and closing state of the degassing liquid inlet 6 through the after-sales switch 7. The motor filling port 5 is located at the bottom of the kettle body 1, and the degassing liquid inlet 6 and the after-sales switch 7 are located at the top of the kettle body 1. The motor filling port 5 and the degassing liquid inlet 6 are communicated with the motor cooling circuit 17, during the degassing process, the after-sales switch 7 is turned on, the water pump in the motor cooling circuit 17 is operated, and the degassing is automatically performed. After the degassing is completed, the after-sales switch 7 is turned off.

Figure 3:
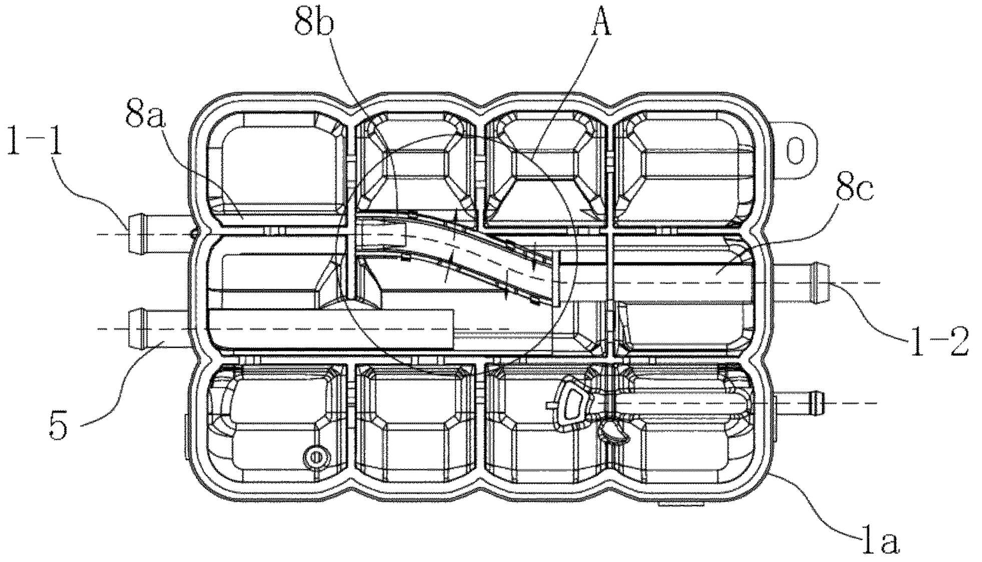
FIG. 3 is a schematic structural view of a lower kettle body of the integrated expansion kettle according to an embodiment of the present application.
Figure 4:
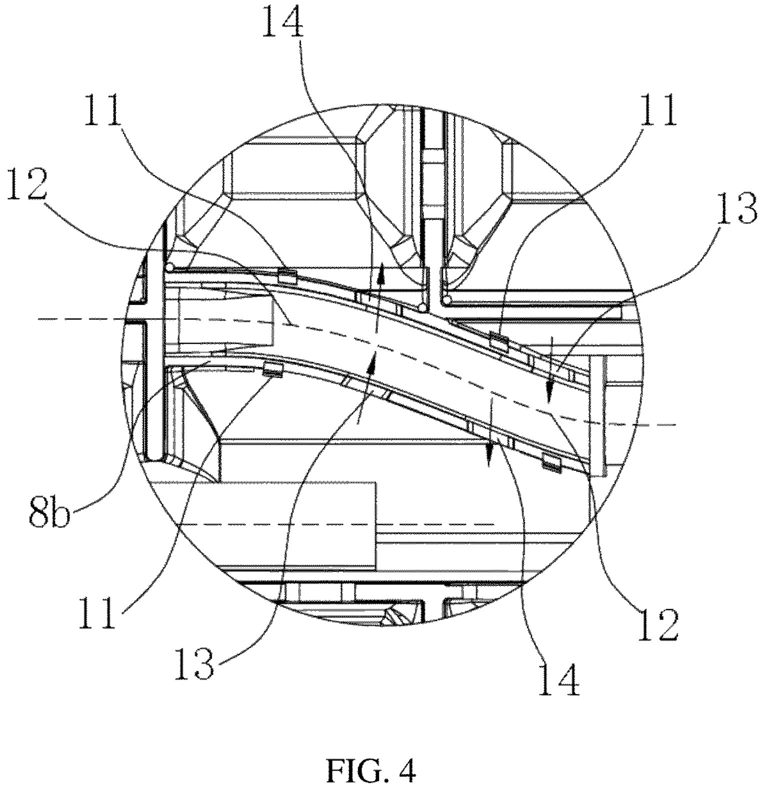
FIG. 4 is an enlarged view at A in FIG. 3.

Referring to FIG. 2, FIG. 3 and FIG. 4, a coolant flow channel 8 passing through the chamber 2 is provided in the kettle body 1, and two ends of the coolant flow channel 8 are communicated with the liquid inlet 1-1 and the liquid outlet 1-2 respectively. The coolant flow channel 8 includes a liquid inlet section **8*a* communicated with the liquid inlet 1-1, a liquid outlet section 8*c* communicated with the liquid outlet 1-2, and a gas-liquid separation section 8*b* connected between the liquid inlet section 8*a* and the liquid outlet section 8*c*. In view of the possibility of tilting during the operation of the installation device, in order to prevent the gas-liquid separation section 8*b* from being exposed to the liquid surface during tilting, the gas-liquid separation section 8*b* is provided in the middle area of the kettle body 1, and the installation height of one end of the gas-liquid separation section 8*b* communicated with the liquid outlet section 8*c* is lower than or equal to the installation height of one end of the gas-liquid separation section 8*b* communicated with the liquid inlet section 8*a*, which is conducive for the gas to gather in the gas-liquid separation section 8*b*** to facilitate degassing.

Figure 5:
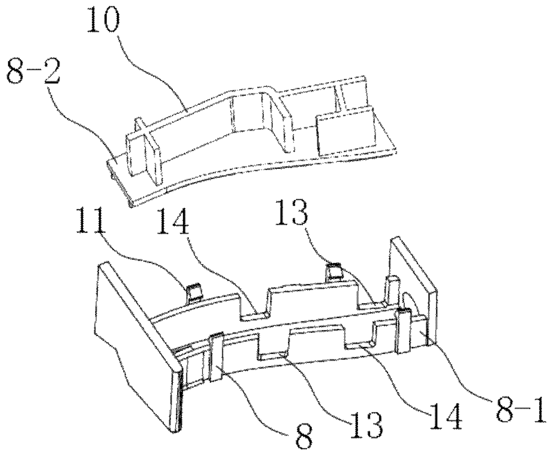
FIG. 5 is an exploded view of a gas-liquid separation section in the integrated expansion kettle according to an embodiment of the present application.
Figure 6:
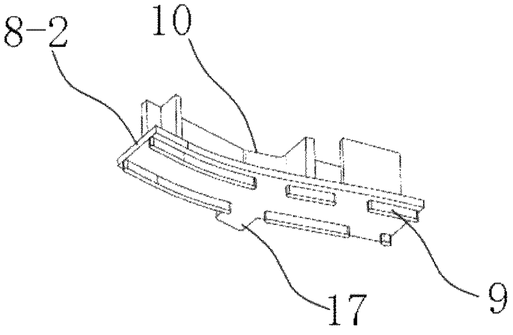
FIG. 6 is a stereoscopic view of an upper cover in the integrated expansion kettle according to an embodiment of the present application.

Referring to FIG. 5 and FIG. 6, the gas-liquid separation section **8*b* includes a downstream channel groove 8-1 and an upper cover 8-2. The downstream channel groove 8-1 is provided in the lower kettle body 1*a*. The first end surface of the upper cover 8-2 is covered on the downstream channel groove 8-1, and the second end surface of the upper cover 8-2 is provided with a second reinforcing rib 10 for improving strength. The second reinforcing rib 10 extends and is abutted against the top of the kettle body 1. The edge of the first end surface of the upper cover 8-2 corresponding to the downstream channel groove 8-1 is provided with a first reinforcing rib 9 for improving strength, a clamping member 11 is provided outside the sidewall of the downstream channel groove 8-1, and the upper cover 8-2 is assembled with the downstream channel groove 8-1 by the clamping member 11. When the upper kettle cap 1*b* is assembled with the lower kettle body 1*a*, the upper cover 8-2 is pressed against the downstream channel groove 8-1 and fixed by the clamping member 11**.

Referring to FIG. 3 and FIG. 4, two fluid redirection portions are provided on the gas-liquid separation section **8*b* of the coolant flow channel 8, and the fluid redirection portion 12 is a bent section. The fluid redirection portion 12 is correspondingly provided with a group of the gas-liquid separation mechanism, and each group of the gas-liquid separation mechanism includes a first opening 13 for the liquid in chamber 2 to flow into the coolant flow channel 8 and a second opening 14 for the liquid in coolant flow channel 8 to flow into the chamber 2. The first opening 13 and the second opening 14 of the two groups of the gas-liquid separation mechanism are both provided on opposite sides of the sidewall of the downstream channel groove 8-1. The edges of the first opening 13 and the second opening 14 extend towards the first end surface of the upper cover 8-2 and are flush with the first end surface of the upper cover 8-2, so as to avoid liquid surface impact. In addition, the first opening 13 is located at the inner bending side of the bent section, and the second opening 14** is located at the outer bending side of the bent section.

It should be noted that when the present embodiment is applied to a vehicle or other walking device, tilting may occur from time to time during operation. In order to prevent the kinetic energy of the liquid and gas from the second opening 14 from being quickly converted into kinetic energy in the vertical direction, reduce the flow rate in the vertical direction, and prevent the water flow from impacting the liquid surface and causing abnormal noise, the water outlet direction of the second opening 14 needs to maintain a large angle with the vertical direction. Therefore, when placed horizontally, the water outlet direction of the second opening 14 is preferably parallel to the liquid surface, and will not cause obstruction to the water outlet.

Referring to FIG. 6, the edge of the upper cover 8-2 is provided with at least one diversion portion 18 extending outward, and the diversion portion 18 is provided corresponding to the second opening 14. The flow distance in the water outlet direction from the second opening 14 is extended to prevent a large flow of liquid carrying gas from directly impacting the liquid surface and causing abnormal noise.

Referring to FIG. 2, FIG. 3 and FIG. 4, when the kettle body 1 is working, the first opening 13 and the second opening 14 are immersed below the liquid surface of the chamber 2, and the vertical distance between the first opening 13 and the second opening 14 and the liquid surface is greater than or equal to 5 mm to prevent the first opening 13 and the second opening 14 from being exposed to the liquid surface when the device is tilting. When the liquid in the coolant flow channel 8 flows through the first opening 13 and the second opening 14, the fluid redirection portion 12 makes the flow velocity of the liquid in the coolant flow channel 8 at the second opening 14 be greater than the flow velocity at the first opening 13. The greater the flow velocity, the smaller the pressure, and the smaller the flow velocity, the greater the pressure, so that the pressure at the first opening 13 is greater than the pressure at the second opening 14. When the kettle body 1 is working, the liquid and gas in the coolant flow channel 8 flow into the chamber 2 from the second opening 14, and the liquid in the chamber 2 is replenished into the coolant flow channel 8 from the first opening 13.

Figure 7:
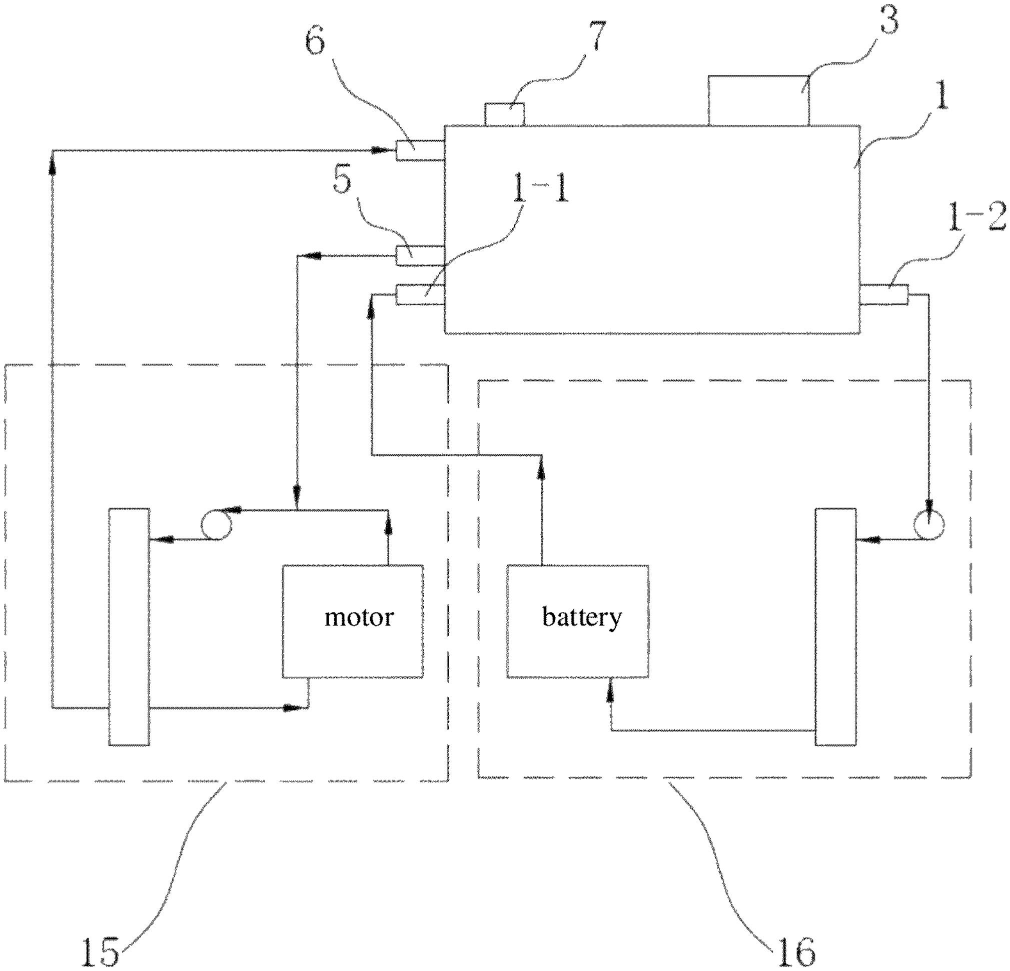
FIG. 7 is a schematic view of a principle of a cooling system according to an embodiment of the present application.

Referring to FIG. 7, a cooling system provided by the technical solution of this embodiment includes a motor cooling circuit, a battery cooling circuit and the expansion kettle described in the above embodiment.

In summary, the technical solutions of the above embodiments provide an integrated expansion kettle and a cooling system. The expansion kettle integrates the gas-liquid separation function, which is communicated with the battery cooling circuit 16 through the liquid inlet and liquid outlet of the kettle body 1, and is communicated with the motor cooling circuit 17 through the motor filling port 5 and the degassing liquid inlet 6. The motor cooling circuit 17 and the battery cooling circuit 16 share one expansion kettle, and a single kettle replaces a double kettle. There is no need for a special gas-liquid separator, and the after-sales switch 7 is integrated. The number of expansion kettles and liquid level sensors 4 is reduced, as well as the number of pipes, pipe clamps, etc., so that the cost and weight of the entire cooling system are reduced sharply.

In the integrated gas-liquid separation function, the coolant flow channel 8 adopts a curved design, and the first opening 13 and the second opening 14 are respectively opened on the inner rounded sidewall and the outer rounded sidewall of the bent section of the coolant flow channel 8. When the fluid passes through the bent section, the flow velocities in the first opening 13 area and the second opening 14 area will be different. The flow velocity in the second opening 14 area is greater than the flow velocity in the first opening 13 area, and the pressure near the second opening 14 is less than the pressure near the first opening 13 area. Therefore, the liquid in the coolant flow channel can carry the gas and flow into the expansion kettle from the opening of the outer rounded sidewall, and the liquid in the expansion kettle can flow into the coolant flow channel from the opening of the inner rounded sidewall, so as to realize the primary separation of gas and liquid and ensure the efficiency of gas-liquid separation. After the gas-liquid mixture is discharged from the flow channel hole, the secondary separation of gas and liquid can be realized by the buoyancy of the air. In this way, the high flow velocity of the cooling circuit will not push the gas-liquid mixture to impact the liquid surface to produce abnormal noise. The degassing time of gas-liquid separation is reduced, the heat leakage is reduced, and the temperature difference between the liquid inlet 1-1 and the liquid outlet 1-2 is also greatly reduced. The problems in the expansion kettle such as high coolant flow rate and incomplete degassing, low flow rate and low degassing efficiency, and large inlet and outlet temperature difference caused by heat leakage are completely solved.

Figure 8:
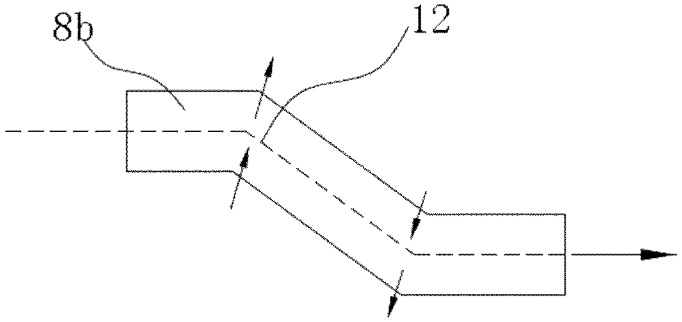
FIG. 8 is a schematic structural view of the gas-liquid separation section in the integrated expansion kettle according to an embodiment of the present application.

Referring to FIG. 8, this embodiment provides a replacement solution for the integrated expansion kettle. Based on the above embodiment, the fluid redirection portion 12 can be a bending section, the first opening 13 is located at the inner bending side of the bending section, and the second opening 14 is located at the outer bending side of the bending section, thereby forming a pressure difference at the first opening 13 and the second opening 14, so that the second opening 14 in the coolant flow channel 8 can discharge liquid and the first opening 13 can replenish liquid.

Figure 9:
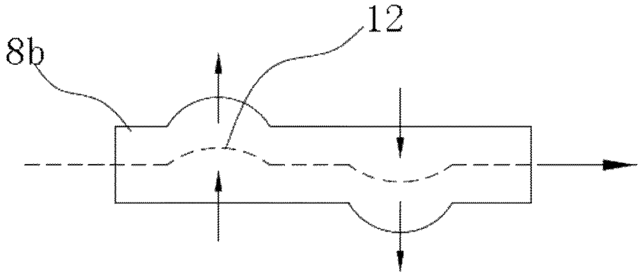
FIG. 9 is a schematic structural view of the gas-liquid separation section in the integrated expansion kettle according to an embodiment of the present application.
Figure 10:
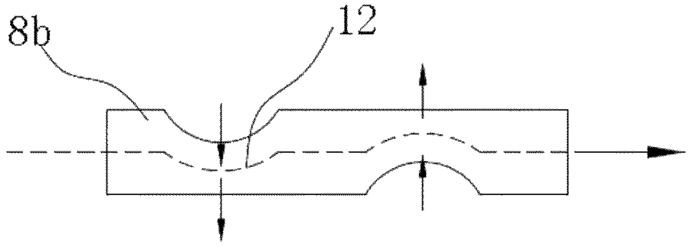
FIG. 10 is a schematic structural view of the gas-liquid separation section in the integrated expansion kettle according to an embodiment of the present application.

Referring to FIGS. 9 and 10, this embodiment provides a replacement solution for the integrated expansion kettle. Based on the above embodiment, the fluid redirection portion 12 can also be formed by one side of the coolant flow channel 8 to be concave or convex, which can produce a flow rate change on the concave side or the convex side of the fluid redirection portion 12, thereby forming a pressure difference between the first opening 13 and the second opening 14, so that the second opening 14 in the coolant flow channel 8 can discharge liquid and the first opening 13 can replenish liquid.

Figure 11:
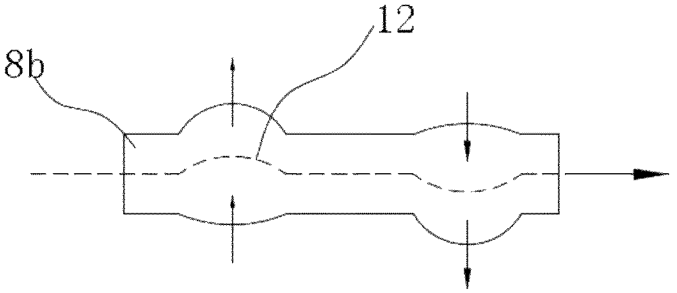
FIG. 11 is a schematic structural view of the gas-liquid separation section in the integrated expansion kettle according to an embodiment of the present application.

Referring to FIG. 11, this embodiment provides a replacement solution for the integrated expansion kettle. Based on the above embodiment, the fluid redirection portion 12 can also be asymmetrically concave or convex on the opposite side at the same time, and different flow rates can also be formed on the opposite side, thereby forming a pressure difference between the first opening 13 and the second opening 14, so that the second opening 14 in the coolant flow channel 8 can discharge liquid and the first opening 13 can replenish liquid.

The technical solution of this embodiment provides a vehicle, including the cooling system as described in the above embodiment.

The above embodiments only illustrate the principle and effect of the present application, and is not intended to limit the present application. Those skilled in the art can modify or change the above embodiment without violating the spirit and scope of the present application. Therefore, all equivalent modifications or changes made by those skilled in the art without departing from the spirit and technical ideas disclosed in the present application should still be covered by the claims of the present application.

What is claimed is:

1. An integrated expansion kettle, comprising:

a kettle body;

a chamber for containing liquid provided inside the kettle body; and a liquid inlet and a liquid outlet provided on the kettle body;

wherein a coolant flow channel passing through the chamber is provided inside the kettle body; one end of the coolant flow channel is communicated with the liquid inlet, and the other end of the coolant flow channel is communicated with the liquid outlet;

at least one group of gas-liquid separation mechanisms is provided on the coolant flow channel; each group of the gas-liquid separation mechanism comprises a first opening provided on the coolant flow channel for liquid in the chamber to flow into the coolant flow channel and a second opening for liquid in the coolant flow channel to flow into the chamber, and a pressure at the first opening is greater than a pressure at the second opening;

when the kettle body is in an operating state where liquid and gas are configured to flow within the coolant flow channel, the liquid and gas in the coolant flow channel are configured to flow into the chamber from the second opening, and liquid in the chamber is replenished into the coolant flow channel from the first opening;

the kettle body is further provided with a motor filling port, a degassing liquid inlet and an after-sales switch, and the degassing liquid inlet is communicated with the after-sales switch and is configured to control an opening state and a closing state of the degassing liquid inlet through the after-sales switch; and the motor filling port is provided at a bottom of the kettle body, and the degassing liquid inlet and the after-sales switch are provided at the top of the kettle body.

2. The integrated expansion kettle according to claim 1, wherein the first opening and the second opening of each group of the gas-liquid separation mechanisms are provided on a same side of the coolant flow channel or opposite sides of the coolant flow channel.

3. The integrated expansion kettle according to claim 1, wherein the first opening and the second opening of each group of the gas-liquid separation mechanisms are provided opposite to each other, or the first opening and the second opening are staggered along a flow direction of the coolant flow channel or a circumferential direction of the coolant flow channel.

4. The integrated expansion kettle according to claim 1, wherein a pressure relief valve and a liquid level sensor are further provided on the kettle body.

5. The integrated expansion kettle according to claim 1, wherein when the kettle body is in the operating state, the first opening and the second opening are submerged below a liquid level of the chamber.

6. The integrated expansion kettle according to claim 5, wherein a vertical distance between the first opening and the second opening and the liquid level is greater than or equal to 5 mm.

7. A cooling system, comprising:

a motor cooling circuit;

a battery cooling circuit; and the expansion kettle according to claim 1.

8. A vehicle, comprising the cooling system according to claim 7.

9. The integrated expansion kettle according to claim 1, wherein one or more fluid redirection portions are provided on the coolant flow channel, and the first opening and the second opening are provided on the fluid redirection portion; and in response to that liquid in the coolant flow channel flows through the first opening and the second opening, the fluid redirection portion is configured to make a flow velocity of liquid in the coolant flow channel at the second opening be greater than a flow velocity of liquid at the first opening.

10. The integrated expansion kettle according to claim 9, wherein the fluid redirection portion is a bent section or a bending section; the first opening is provided at an inner bending side of the bent section or an inner bending side of the bending section, and the second opening is provided at an outer bending side of the bent section or an outer bending side of the bending section.

11. The integrated expansion kettle according to claim 9, wherein one side of the coolant flow channel is concave or convex to form the fluid redirection portion.

12. The integrated expansion kettle according to claim 1 wherein the coolant flow channel comprises a liquid inlet section communicated with the liquid inlet, a liquid outlet section communicated with the liquid outlet, and a gas-liquid separation section connected between the liquid inlet section and the liquid outlet section; and the gas-liquid separation section is provided at a middle area of the kettle body, and the first opening and the second opening of the gas-liquid separation mechanism are provided on the gas-liquid separation section.

13. The integrated expansion kettle according to claim 12, wherein an installation height of one end of the gas-liquid separation section communicated with the liquid outlet section is lower than or equal to an installation height of one end of the gas-liquid separation section communicated with the liquid inlet section.

14. The integrated expansion kettle according to claim 12, wherein the gas-liquid separation section comprises a downstream channel groove and an upper cover; a first end surface of the upper cover is covered on the downstream channel groove, and a second end surface of the upper cover is abutted against a top of the kettle body; and the first opening and the second opening of the gas-liquid separation mechanism are opened on a sidewall of the downstream channel groove.

15. The integrated expansion kettle according to claim 14, wherein an edge of the first opening and an edge of the second opening are configured to extend towards the first end surface of the upper cover and are flush with the first end surface of the upper cover.

16. The integrated expansion kettle according to claim 14, wherein an edge of the upper cover is provided with at least one diversion portion extending outward, and the diversion portion corresponds to the second opening.

17. The integrated expansion kettle according to claim 14, wherein a first reinforcing rib is provided on the first end surface of the upper cover corresponding to an edge of the downstream channel groove, and a second reinforcing rib is provided on the second end surface of the upper cover; and the second reinforcing rib is configured to extend and abut against the top of the kettle body.

18. The integrated expansion kettle according to claim 14, wherein a clamping member is provided on the sidewall of the downstream channel groove, and the upper cover is assembled with the downstream channel groove through the clamping member.

19. The integrated expansion kettle according to claim 14, wherein the kettle body comprises a lower kettle body and an upper kettle cap, and the downstream channel groove is provided in the lower kettle body;

the first end surface of the upper cover is covered on the downstream channel groove, and the second end surface of the upper cover is abutted against the upper kettle cap; and in response to that the upper kettle cap is assembled with the lower kettle body, the upper cover is tightly pressed against the downstream channel groove.

* * * * *